United States Patent Office 2,709,835
Patented June 7, 1955

2,709,835

FLUE LINER AND METHOD OF MAKING SAME

Verne Frese, Seattle, Wash., assignor of one-half to Ray McCleery, Seattle, Wash.

No Drawing. Application January 19, 1953,
Serial No. 332,104

5 Claims. (Cl. 18—47.5)

The present invention relates to flue liners and more particularly to an improved flue liner of treated pumice concrete as distinguished from terra cotta.

It is a principal object of my invention to provide a flue liner which is lighter in weight and more economical to produce than conventional terra cotta flue liners, and yet which is highly acid resistant and impervious to the passage of moisture or flue gases while at the same time having fusion, strength, and thermal shock characteristics competitive to those of clay liners.

Other objects and advantages in view will, with the foregoing, appear and be understood in the course of the following description and claims, the invention consisting in the novel construction, adaptation and combination of the parts hereinafter described and claimed.

The first step in the manufacture of my improved flue liner is to produce a pumice aggregate concrete unit of the desired liner size on a conventional concrete block machine using vibration and compression. This unit, after setting up, is then dipped in a cement water mixture including calcium chloride and sodium silicate as additives, the dip formula being as follows:

| | Parts |
|---|---|
| Cement | 200 |
| Water | 150 |
| Calcium chloride | 2 |
| Sodium silicate | 1 |

The quantity of water is made such is to give the dip the consistency of thick paint. After the unit has been dipped the resulting liner is cured by steam or by being kept moist for two or three days.

The primary function of the cement in the dip is to coat the surface and fill the pores of the pumice aggregate concrete block thus reducing the surface exposed to flue gases. This coating is made more impervious by way of the fact that the calcium chloride acts as a mix densifier to reduce the porosity and as a wetting agent to provide a smoother mix and reduce the tendency of the solids to settle out of the dipping solution. The calcium chloride also serves as a bonding agent to cause better adherence between the cement in the dip and the pumice concrete of the treated liner unit.

The filling of the pores of the liner is also aided by the sodium silicate which provides resistance to the passage of moisture and hence serves as a waterproofing agent. Not to be overlooked is the fact that the sodium silicate gives valuable resistance to acid attack.

The quantities of the calcium chloride and sodium silicate additives above recited are not critical but do give the desired liner characteristics for normal usages. In other words a further increase in the proportions of these additives gives such a slight additional increase in the beneficial results that the same is not economically practicable.

Of value is the fact that after dipping, and before curing, several liner units may be placed together end for end and the dipping fluid will act as cement to bind them together in multiple lengths as desired.

My improved flue liner has been thoroughly tested to prove its acceptability under the strictest of building code requirements. A softening point test was run on a cone cut from a piece of my flue liner and it was determined that the fusion point is well above the normal code requirement of 1925° F. In fact at 2400° F. it requires several hours to melt through the liner. Although flue lining is considered a non-structural unit, strength tests were run to find the loss in strength due to fire exposure. My flue liner, after exposure to 1000° F. for one hour, has a strength of 730 p. s. i., and if moistened this strength increases to 1250 p. s. i. as the cement rehydrates. After exposure to 1750° F. the strength still is 400 p. s. i. The significance of these figures is shown by the fact that ASTM C90–44 requires only 350 p. s. i. for non-bearing units.

Another test was run to give comparison between the terminal shock resistance of my improved flue liner and that of conventional clay liners. In this test two feet of my liner followed by two feet of clay liner were laid horizontally and an oil burner turned into the end. In this arrangement my liner acted as a fire box and was subjected to the highest temperatures. About one minute after the fire was lighted the clay liner cracked with an audible ping. The test was continued for five hours and at the end of that time the crack in the clay liner was opened about one and one-half inches. My liner, on the other hand, appeared intact on the outside. It was glazed in excess of one-fourth inch on the inside showing that the temperature had exceed 2200° F. during the test.

From the foregoing description and remarks, it will appear that I have applied the economy of masonry production to the flue lining field. Minor changes in the details of construction will suggest themselves and may be resorted to without departing from the spirit of the invention, wherefor it is my intention that no limitations be implied and that the hereto annexed claims be given a scope fully commensurate with the broadest interpretation to which the employed language admits.

What I claim is:

1. A flue liner comprising a pumice aggregate concrete block coated and impregnated with a water solution comprising cement as a major constituent and calcium chloride and sodium silicate as minor constituents.

2. The process of forming a flue liner comprising producing a pumice aggregate concrete block using vibration and compression, coating said block and filling the external pores thereof by dipping the block in a cement water solution having a thick consistency and containing calcium chloride and sodium silicate as additives, and then curing the resulting coated block.

3. The process of forming a flue liner from a pumice aggregate concrete block comprising the steps of dipping the block into a thick water solution containing cement as a major constituent and containing calcium chloride and sodium silicate as minor constituents so as to impregnate the pores and coat the surface of the block with the solution and then curing the block.

4. The process of forming a flue liner from a pumice aggregate concrete block comprising the steps of dipping the block into a thick solution comprising the following proportions by weight approximately 100 parts of cement, one part of calcium chloride and 75 parts of water so as to impregnate the pores and coat the surface of the block with the solution, and then curing the block.

5. The process of forming a flue liner from a pumice aggregate concrete block comprising the steps of dipping the block into a thick solution comprising the following proportions by weight approximately 200 parts of cement, 2 parts of calcium chloride, one part of sodium silicate, and 150 parts of water so as to impregnate the pores and coat the surface of the block with the solution, and then curing the block.

References Cited in the file of this patent

UNITED STATES PATENTS

| | | |
|---|---|---|
| 1,782,460 | Carlson | Nov. 25, 1930 |
| 1,876,357 | Stadtfeld | Sept. 6, 1932 |
| 2,336,723 | Drummond | Dec. 14, 1943 |
| 2,393,597 | Drummond | July 29, 1946 |
| 2,483,498 | Lewon et al. | Oct. 4, 1949 |
| 2,581,579 | Davis | Sept. 28, 1952 |

FOREIGN PATENTS

| | | |
|---|---|---|
| 12,076 | Great Britain | 1891 |